July 17, 1923.
H. E. AUSTIN ET AL
1,462,255
RUNNING GEAR FOR WHEELED VEHICLES
Filed Dec. 8, 1922
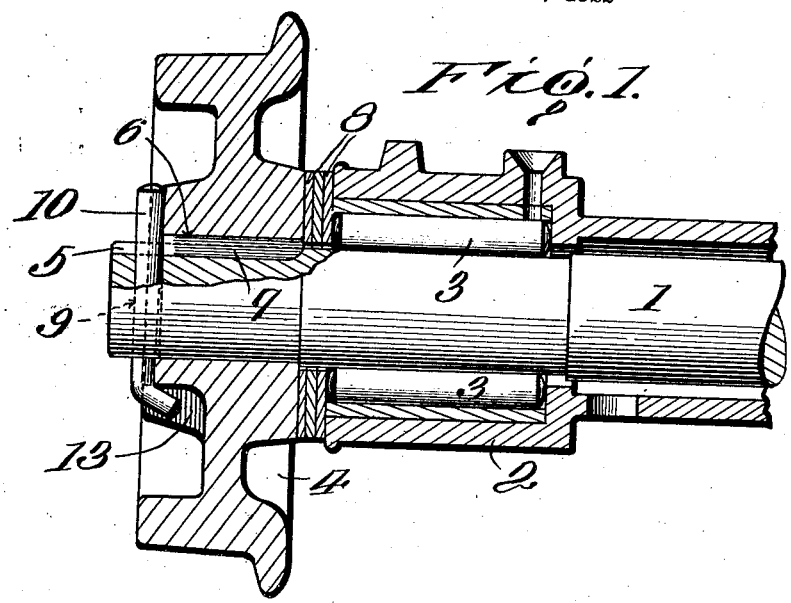
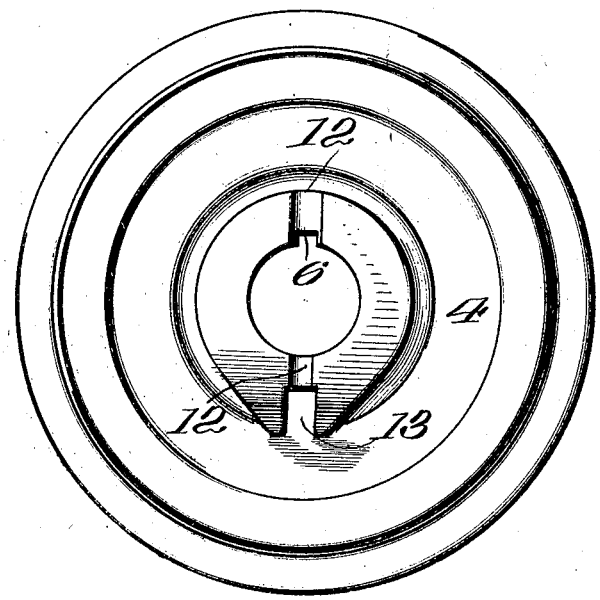
Inventors
H. E. AUSTIN and
JESSE C. COOK.
By
Their Attorney Patented July 17, 1923.

1,462,255

UNITED STATES PATENT OFFICE.

HAROLD E. AUSTIN, OF LOUISVILLE, KENTUCKY, AND JESSE C. COOK, OF JEFFERSONVILLE, INDIANA, ASSIGNORS TO AMERICAN CREOSOTING COMPANY, OF LOUISVILLE, KENTUCKY, A CORPORATION OF INDIANA.

RUNNING GEAR FOR WHEELED VEHICLES.

Application filed December 8, 1922. Serial No. 605,729.

*To all whom it may concern:*

Be it known that we, HAROLD E. AUSTIN, of Louisville, in the county of Jefferson, State of Kentucky, and JESSE C. COOK, of Jeffersonville, in the county of Clark, State of Indiana, both citizens of the United States, have invented certain new and useful Improvements in Running Gears for Wheeled Vehicles; and we do hereby declare the following to be a full, clear, and exact description of the invention, such as will enable others skilled in the art to which it appertains to make and use the same.

Our invention relates to running gear for wheeled vehicles and particularly to that class wherein the wheel is secured to the axle and the latter revolves in fixed bearings as illustrated in Letters Patent No. 1,126,251 granted January 26, 1915, upon an application of Robert H. Moore. In the use of running gear such as is shown in the patent, which is especially adapted to tram cars used in timber preserving plants, difficulty has been experienced in maintaining the wheel on the axle so as to prevent relative rotation, which, because of the absence of lubrication between the axle and the wheel, causes wear on both, and the tapered pin heretofore employed for holding the wheel on the axle is overstressed in the movement of the cars around curves, causing it to gradually become loose and to drop out with consequent damage to the tram.

The object of our invention is to provide improved and simple means for overcoming these objections, such improved means effectively coupling the wheel and axle and being so disposed as to be locked against accidental displacement.

In the drawings, Figure 1 is a sectional view on one end of an axle with my improved wheel secured thereto. Figure 2 is a face view of the wheel.

Referring to the drawings, the axle 1 is supported by a fixed housing 2 with interposed roller bearings 3, the end of the axle being of reduced diameter to receive the wheel 4 and having a slot 5 alined with a complementary slot 6 in the wheel to receive the key 7 by which these members are locked against relative rotation. Between the hub and the outer end of the housing are metallic wear plates 8.

Extending transversely of the axle and through the slot 5 is a bore 9 through which a tapered pin 10 projects. The exposed face of the hub of the wheel 2 is slotted diametrically as at 12 to form a seat for the pin 10 and is preferably tapered to correspond with the shape of the pin. This slot is in the same diametrical plane as the slot 6 so that the pin 10 is effective to hold the key 7 in position. The narrow extremity of the slot 12 terminates in a recess 13 formed in the wheel hub and the end of the tapered pin is designed to be forced into this recess, the side walls of which will prevent any turning movement of the pin.

The advantages of our invention will be apparent. By arranging the bore of the axle and the slot in the outer face of the wheel in the same diametrical plane with the longitudinal slot of the axle and the slot 6 in the wheel the key by which wheel and axle are locked is firmly held against displacement by the pin 9, and all danger of the latter working loose is avoided by providing the recess to receive the bent end of the pin.

We claim as our invention:

1. Running gear for wheeled vehicles including a revoluble axle having a longitudinal slot and a transverse bore near each wheel carrying end, a wheel keyed to such axle through such slot, the hub of said wheel being slotted diametrically on one face and having a recess at one end of said slot, and a pin extending through the bore of said axle and seated in the slot of said wheel, the end of said pin being bent to lie in said recess.

2. Running gear for wheeled vehicles including a revoluble axle and a wheel, each having a slot, a key fitted in said slots for locking said wheel against rotary movement on said axle, said axle having a transverse bore intercepting its slot, said wheel having a slot on one face in the same diametrical plane with its first mentioned slot and at right angles thereto, and a recess at one end of said face slot, and a pin extending through the bore of said axle and seated in the face slot of said wheel, one end of said pin blocking the path of said key to prevent endwise movement thereof, and the other end being bent into said recess.

In testimony whereof we have signed this specification.

HAROLD E. AUSTIN.
JESSE C. COOK.